US012350813B2

(12) United States Patent
Burden

(10) Patent No.: US 12,350,813 B2
(45) Date of Patent: Jul. 8, 2025

(54) NESTING TOOL TRAY SET

(71) Applicant: TOOLBOX WIDGET INC., Columbia Falls, MT (US)

(72) Inventor: Tom Joseph Burden, Celina, OH (US)

(73) Assignee: TOOLBOX WIDGET INC., Columbia Falls, MT (US)

( * ) Notice: Subject to any disclaimer, the term of this patent is extended or adjusted under 35 U.S.C. 154(b) by 0 days.

(21) Appl. No.: 18/163,805

(22) Filed: Feb. 2, 2023

(65) Prior Publication Data

US 2024/0261960 A1 Aug. 8, 2024

(51) Int. Cl.
*B25H 3/06* (2006.01)

(52) U.S. Cl.
CPC .................................... *B25H 3/06* (2013.01)

(58) Field of Classification Search
CPC .......... B25H 3/06; B25H 3/023; B25H 3/026; B25H 3/00; B25H 3/021; B65D 21/0233; B65D 1/22; B65D 21/043; B65D 25/026; B65D 21/00; B65D 21/0209; B65D 21/0212
USPC ....... 206/373, 372, 499, 503, 561, 370, 505, 206/55; 220/23.6, 23.83, 528, 23.86, 529, 220/23.88, 505
See application file for complete search history.

(56) References Cited

U.S. PATENT DOCUMENTS 2,944,694 A * 7/1960 Kinsey .................. A47G 23/06 220/23.88
3,029,117 A * 4/1962 Romanek ................ B25H 3/02 312/200
3,780,468 A * 12/1973 Maffett .................. A01K 97/06 43/54.1
4,595,102 A * 6/1986 Cianci .................... A61B 50/33 206/370
4,736,850 A * 4/1988 Bowman ............... A61F 2/0095 206/370
5,040,681 A * 8/1991 Grusin ................. B43M 99/008 206/505
5,386,922 A * 2/1995 Jordan .............. B65D 77/0486 220/4.27
5,454,478 A * 10/1995 Everson ............... B65D 25/107 220/528
5,669,498 A * 9/1997 Fierek ...................... B25H 3/06 206/509
5,890,614 A * 4/1999 Dancyger ................ B25H 3/06 220/23.6

(Continued)

OTHER PUBLICATIONS

Recoil Audio, "STT-K3 Silicone Non-Slip Flexible Tool Tray Organizer Trio Pack", <https://www.recoilaudio.com/product/silicone-non-slip-flexible-tool-tray-organizer-intro-pack/>, retrieved Jan. 18, 2023, copyright 2022, 3 pages.

*Primary Examiner* — Anthony D Stashick
*Assistant Examiner* — Prince Pal
(74) *Attorney, Agent, or Firm* — Christensen O'Connor Johnson Kindness PLLC

(57) ABSTRACT

A set (10) of tool trays (12, 14, and 16) that are of flexible construction to conform to a curved or otherwise contoured surface on which the trays. The trays are composed of material so as not to slip or skid on the curved or sloped placement surface. Also, the tool trays (12, 14, and 16) nest together each tray into the next larger tray for compact storage or shipment while also providing compartments large enough to be functional to hold mechanics tools.

19 Claims, 3 Drawing Sheets

(56) References Cited

U.S. PATENT DOCUMENTS

| | | | | | |
|---|---|---|---|---|---|
| 6,112,896 | A * | 9/2000 | Bal | B30B 15/0082 | 220/23.6 |
| 7,140,304 | B1 | 11/2006 | Lawrie | | |
| 8,967,379 | B2 * | 3/2015 | Kinskey | B25H 3/023 | 190/110 |
| 2005/0051444 | A1 * | 3/2005 | Hurt | A01K 97/06 | 206/315.11 |
| 2006/0027475 | A1 * | 2/2006 | Gleason | B25H 3/021 | 190/110 |
| 2010/0171020 | A1 | 7/2010 | Canino et al. | | |
| 2010/0236965 | A1 * | 9/2010 | Hernandez | B65D 21/0209 | 206/505 |
| 2011/0084078 | A1 * | 4/2011 | Twig | B25H 3/022 | 220/507 |
| 2011/0226766 | A1 * | 9/2011 | Baker | B65D 1/36 | 220/23.88 |
| 2011/0259897 | A1 * | 10/2011 | Coursey | F25D 3/08 | 220/508 |
| 2013/0126387 | A1 * | 5/2013 | Rowe | A47G 21/14 | 206/553 |
| 2016/0235235 | A1 * | 8/2016 | Burden | B60N 3/048 | |
| 2018/0251263 | A1 * | 9/2018 | Shamp | B65D 21/0233 | |
| 2019/0375551 | A1 * | 12/2019 | Bell | B65D 25/06 | |
| 2022/0369571 | A1 * | 11/2022 | Pointek | B65D 25/08 | |
| 2023/0120366 | A1 * | 4/2023 | Stevens | B65D 25/06 | 220/529 |

* cited by examiner

NESTING TOOL TRAY SET

BACKGROUND

The present disclosure pertains to a set of at least different size tool trays that are constructed of flexible but durable material so that the trays can conform to a curved or otherwise contoured surface on which the trays are set. Also, the trays are composed of material so as not to slip or slide on a curved or sloped placement surface. In addition, the tool trays nest together, each one into the next larger tray for compact storage or shipment, while also configured to provide storage compartments large enough to be functional to hold standard mechanics tools, such as wrenches, plyers, screw drivers, flashlights, and even power tools.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a nesting tool tray set is provided. The nesting tool includes a first tray comprising a first flexible base and a plurality of first compartments formed by first flexible dividing walls extending upwardly from the first base, a second tray comprising a second flexible base and a plurality of second compartments formed by second flexible dividing walls extending upwardly from the second base, a third tray comprising a third flexible base and a plurality of third compartments formed by third flexible dividing walls extending upwardly from the third base, wherein one of the first compartments is sized and shaped to receive/nest closely therein the entire second tray, and wherein one of the second compartments is sized and shaped to receive/nest closely therein the entire third tray.

In any of the embodiments described herein, wherein the first compartments are of a plurality of different sizes and shapes.

In any of the embodiments described herein, wherein of the plurality of different sizes and shapes of the first compartments, the largest of the first compartments is sized and shaped to closely receive the second tray.

In any of the embodiments described herein, wherein the second tray occupies substantially the entire volume of the largest of the first compartments.

In any of the embodiments described herein, wherein the second compartments are of a plurality of different sizes and shapes.

In any of the embodiments described herein, wherein of the plurality of different sizes and shapes of the second compartments, the largest of the second compartments is sized and shaped to closely receive the third tray.

In any of the embodiments described herein, wherein the third tray occupies substantially the entire volume of the largest of the second compartments.

In any of the embodiments described herein, wherein the second compartments are of a plurality of different sizes and shapes.

In any of the embodiments described herein, wherein of the plurality of different sizes and shapes of the second compartments, the largest of the second compartments is sized and shaped to closely receive the third tray.

In any of the embodiments described herein, wherein: (a) the first compartment that is sized and shaped to closely receive the second tray is constructed of a first length, with the first length closely corresponding to the length of the second tray; and (b) the second compartment that is sized and shaped to closely receive the third tray is constructed of a second length extending substantially the entire length of the second tray, with the second length closely corresponding to the length of the third tray.

In any of the embodiments described herein, wherein at least one of the third compartments extending the length of the third tray.

In any of the embodiments described herein, wherein the second compartment that is sized and shaped to closely receive the third tray is constructed of a second length extending substantially the entire length of the second tray, with the second length closely corresponding to the length of the third tray.

In any of the embodiments described herein, wherein at least one of the third compartments extending the length of the third tray.

In accordance with another embodiment of the present disclosure, a nesting tool tray set is provided. The nesting tool tray set includes a first tray comprising a first flexible base and a plurality of first compartments formed by first flexible dividing walls extending upwardly from the first base, a second tray comprising a length, a second flexible base and a plurality of second compartments formed by second flexible dividing walls extending upwardly from the second base, a third tray comprising a length, a third flexible base and a plurality of third compartments formed by third flexible dividing walls extending upwardly from the third base, wherein one of the first compartments is sized and shaped to receive closely therein the entire second tray, wherein one of the second compartments extends the entire length of the second tray and is sized and shaped to receive closely therein the entire third tray, and wherein one of the third compartments extends the entire length of the third tray.

In any of the embodiments described herein, wherein the first compartments are of a plurality of different sizes and shapes.

In any of the embodiments described herein, wherein of the plurality of different sizes and shapes of the first compartments, the largest of the first compartments is sized and shaped to closely receive the second tray.

In any of the embodiments described herein, wherein the second tray occupies substantially the entire volume of the largest of the first compartments.

In any of the embodiments described herein, wherein the second compartments are of a plurality of different sizes and shapes.

In any of the embodiments described herein, wherein of the plurality of different sizes and shapes of the second compartments, the largest of the second compartments is sized and shaped to closely receive the third tray.

In any of the embodiments described herein, wherein the third tray occupies substantially the entire volume of the largest of the second compartments.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
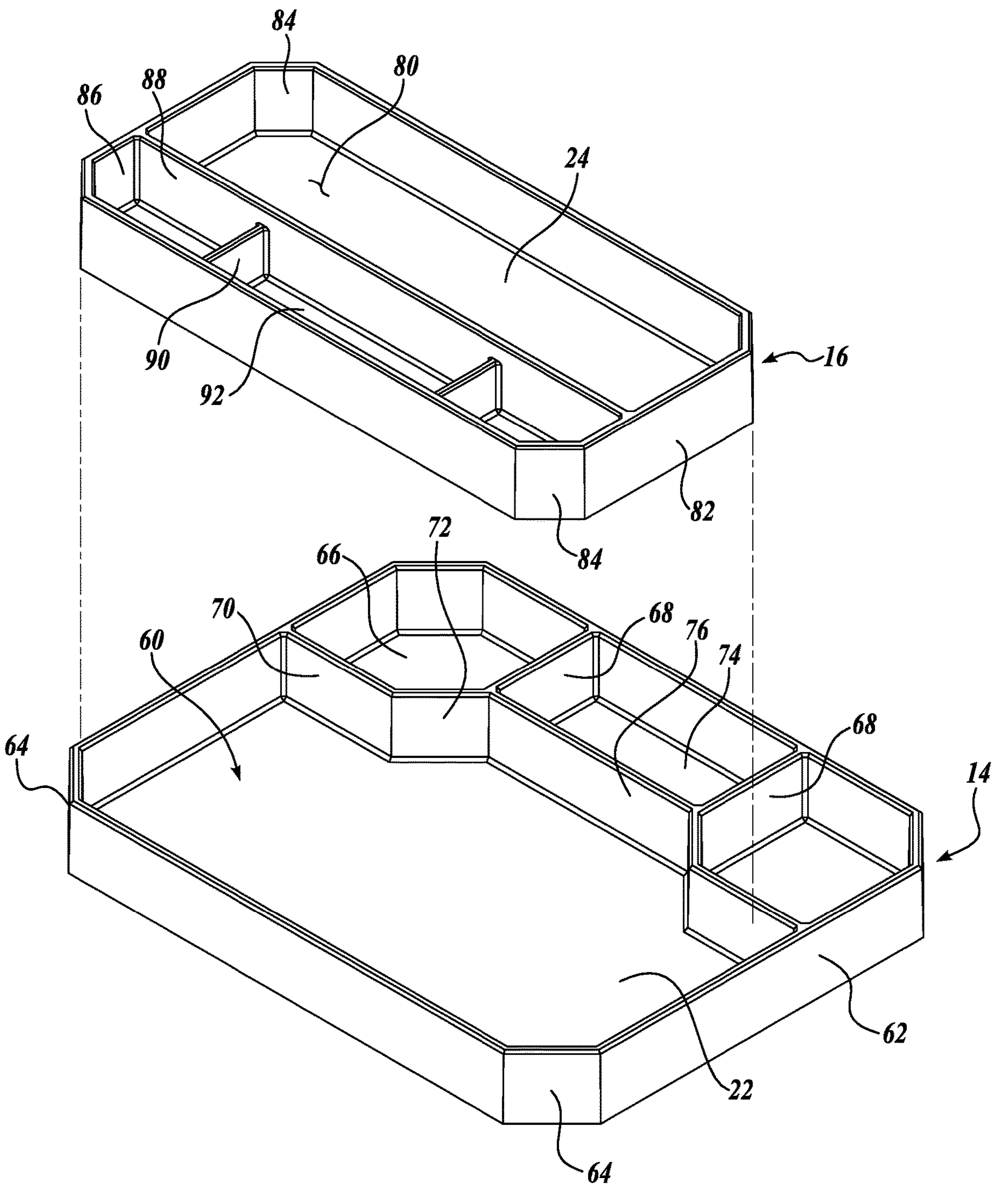
FIG. 1 is an isometric of small and medium size trays which are nestable together.

Various example embodiments of the present disclosure are described below with reference to the accompanying drawings in which some example embodiments are illustrated. In the figures, the thicknesses of lines, layers and/or regions may be exaggerated for clarity.

While example embodiments are capable of various modifications and alternative forms, embodiments thereof are shown by way of example in the figures and are described in detail below. It should be understood, however, that there is no intent to limit example embodiments to the particular forms disclosed, but on the contrary, example embodiments are to cover all modifications, equivalents, and alternatives falling within the scope of the disclosure.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be considered in the specific context this definition is given herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right hand," left hand," "in," "out," "extended," "advanced," "retracted," "proximal," "distal," "central," "vertical," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

Figure 2:
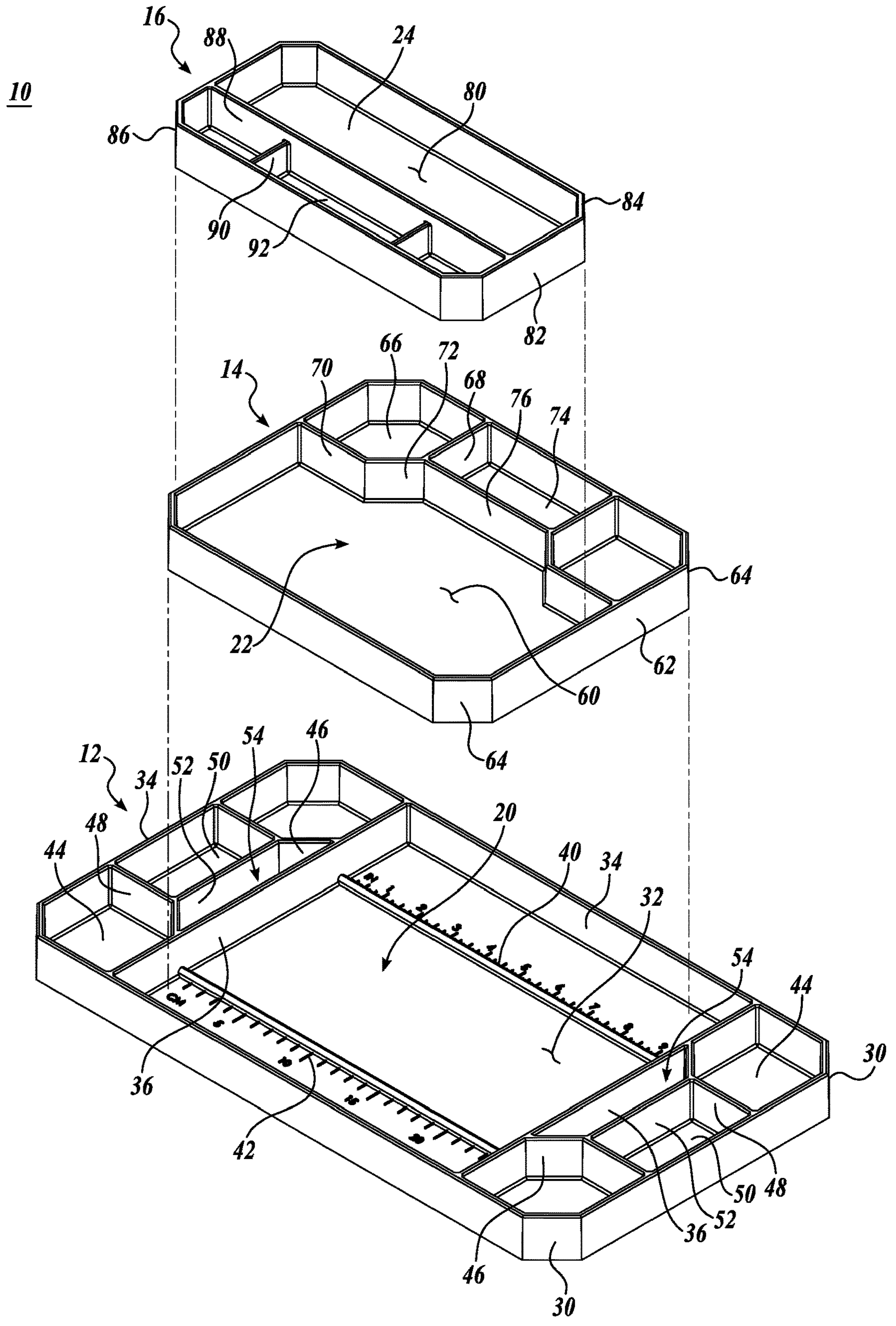
FIG. 2 is an isometric view of small, medium and large size trays that are nestable together.
Figure 3:
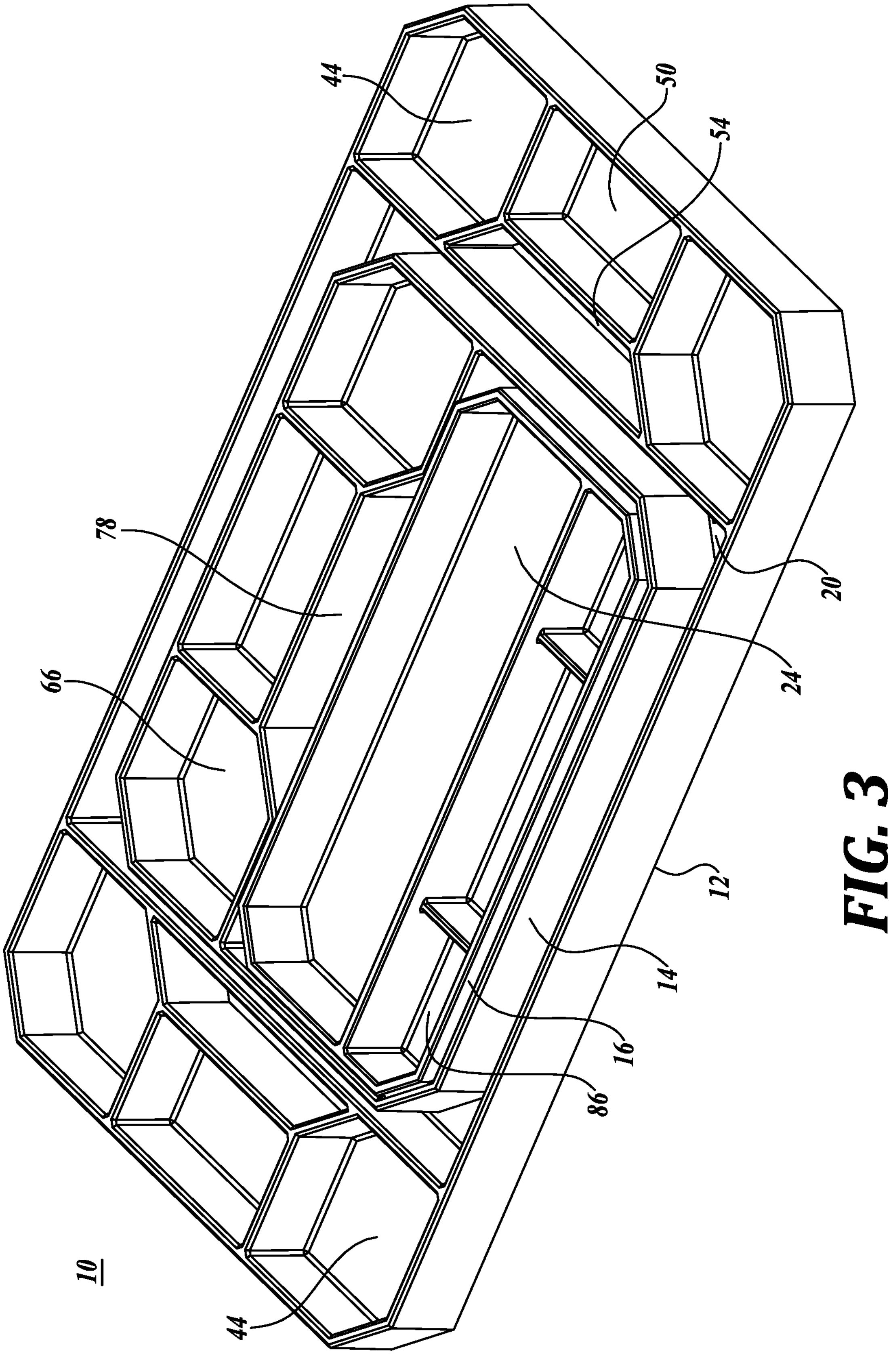
FIG. 3 is an isometric view of the trays of FIG. 2 nested together.

In basic form, as one example shown in FIGS. 1, 2, and 3, the present disclosure pertains to a set 10 of tool trays 12, 14, and 16 that are of flexible construction so that they can conform to a curved or otherwise contoured surface on which the trays are set and are composed of material so as not to slip or skid on a curved or sloped placement surface. Also, the tool trays 12, 14, and 16 nest together for compact storage or shipment while also providing compartments large enough to be functional to hold mechanics tools. To this end, the large size tray 12 has a central compartment 20 that is sized and shaped to closely nest or receive the intermediate size tray 14. In turn, the intermediate size tray 14 has a compartment 22 that is sized and shaped to closely nest or receive therein the small tray 16. Further, the small tray 16 has a compartment 24 that extends the full length of the tray 16, and thus is large enough to hold common and standard mechanics tools, such as wrenches, plyers, screw drivers, etc.

Next describing the tool tray set 10 in more specificity, the large tray 12 is generally rectangular in shape having the length and a width. The corners 30 of the tray 12 are beveled so as to not present sharp corners to reduce the likelihood of damage to the tray when hitting an object and also to enhance the flexibility of the tray. Rather than the corners 30 being beveled, they can instead be rounded or of another shape that is not square.

The tray 12 is constructed with a substantially flat, but flexible and non-skid base 32. A perimeter wall 34 extends around the perimeter of the base 32. As with the base 32, the perimeter wall 34 is also constructed from flexible material. In this manner, the tray 12 is capable of matching or assuming the contour of the surface on which the tray 12 is set, as well as staying in place. Also, the perimeter wall 34 is flexible enough to retain its function as a wall for retaining tools within the tray 12.

Parallel, spaced apart, flexible transverse walls 36 extend across the width of the base to define a relatively large central compartment 20 that is sized to closely receive or nest the intermediate size tray 14 therein. When the tray set 10 is in use, the compartment 20 is easily sufficiently large to conveniently hold a number of mechanic's tools or other items within the compartment 20 itself.

As shown in FIG. 2, a length scale 40 is provided in inches, and a second length scale 42 is provided in centimeters along the base or bottom of the compartment 20. These scales can be conveniently used to measure parts, fasteners, or other items.

Corner compartments or pockets 44 are formed by diagonal flexible dividing walls 46 and flexible longitudinal dividing walls 48 in conjunction with perimeter wall 34 and transverse walls 36. The compartments are not long enough to hold wrenches, plyers, or screwdrivers, but can hold other types of tools such as sockets or to hold fastener components, such as bolts, nuts, washers, etc.

End compartments or pockets 50 are formed by flexible transverse dividing walls 52. A hand hold or grip 54 is formed by transverse walls 36, transverse dividing walls 52, and diagonal dividing walls 46. As shown in FIG. 3, at hand hold 54, the base 32 is open, so that the fingers of the user can extend upwardly into the hand hold 54 to thereby securely hold the tray 12, for example, when lifting or moving the tray.

Referring to FIGS. 1 and 2, the intermediate or medium size tray 14 is sized and shaped to nest closely into central compartment 20 of tray 12. As such, the overall shape and size of the tray 14 closely corresponds with the shape and size of the tray compartment 20.

As with tray 12, tray 14 is constructed with a substantially flat, but flexible and non-skid base 60. A perimeter wall 62 extends around the base 60. As with the base 60, the perimeter wall 62 is also constructed from flexible material, whereby the tray 14 is capable of matching or assuming the contour of the surface on which the tray 14 is set, as well as staying in place and not slipping on the placement surface.

As with the corners 30 of tray 12, the corners 64 of the tray 14 are also beveled so as to not present sharp corners, thereby to reduce the likelihood of damage to the tray when hitting an object and also to enhance the flexibility of the tray. Rather than the corners 64 being beveled, they can instead be rounded or of another shape that is not square.

As shown, a significant portion of the area of the tray is occupied by a compartment 22 that is sized and shaped to closely receive tray 16 therein. The compartment 22 extends the full length of the tray 14, which in turn means that the length of the compartment 22 corresponds to the length of compartment 20 of tray 12. As such, the compartment 22 is long enough to hold within the interior of the compartment 22 typical mechanic's tools, such as wrenches, plyers, screw drivers, flash lights, and even power tools, such as an impact wrench.

Corner compartments or pockets 66 are formed in the corners opposite the compartment 22 by transverse 68 and longitudinal 70 flexible dividing walls that intersect with an interior diagonal dividing wall 72 that is positioned opposite to a corner 64.

A side pocket or compartment 74 is formed by a flexible longitudinal dividing wall 76 spanning between the interior ends of the transverse dividing wall 68 of the corner compartments or pockets 66. As can be seen in FIG. 3, a well or space 78 is defined between the longitudinal dividing wall 76 and the exterior of the tray 16. The well or space 78 provides a convenient location for fingers when grasping the tray 16, for example when placing the tray 16 into the compartment 22 of tray 14 or when removing the tray 16 from the compartment 22.

Referring to the figures, the small size tray 16 is sized and shaped to nest closely into compartment 22 of tray 14. As such, the overall shape and size of the tray 16 closely corresponds with the shape and size of the tray compartment 22.

As with trays 12 and 14, tray 16 is constructed with a substantially flat, but flexible and non-skid base 80. A perimeter wall 82 extends around the base 80. As with the base 80, the perimeter wall 82 is also constructed from flexible material, whereby the tray 16 is capable of matching or assuming the contour of the surface on which the tray 16 is set, as well as staying in place and not slipping on the placement surface.

As with the corners 30 of tray 12 and the corners 64 of tray 14, the corners 84 of the tray 16 are also beveled so as to not present sharp corners, thereby to reduce the likelihood of damage to the tray and also to enhance the flexibility of the tray. Rather than the corners 84 being beveled, they can instead be rounded or of another shape that is not square.

As shown, a significant portion of the area of the tray 16 is occupied by a major compartment 24. The compartment 24 extends the full length of the tray 16, which in turn means that the length of the compartment 24 corresponds to the length of the compartment 22 of tray 14, as well as the length of the compartment 20 of tray 12. As such, the compartments 20, 22, and 24 are all of about the same length, with the exception of the wall thicknesses of perimeter walls 62 and 82. As a result, all three compartments 20, 22, and 24 are long enough to hold within the interior of the compartments themselves typical mechanic's tools, such as wrenches, plyers, screw drivers, flash light, etc.

Corner compartments or pockets 86 are formed in the corners opposite the compartment 24 by a flexible longitudinal dividing wall 88 that also forms compartment 24. Transverse flexible dividing walls 90 span between the perimeter wall 82 and the longitudinal dividing wall 88 to form not only the corner compartment 86, but also a central side compartment 92.

As noted above, the trays 12, 14, and 16 are composed of a flexible, non-skin material so that the trays can assume the contour of the surface on which the trays are set, while also resisting slipping or sliding on the surface. Non-limiting examples of these materials include silicone rubber, food grade silicone rubber, TPV thermoplastic vulcanizates and medical grade TPV thermoplastic vulcanizates.

It will be appreciated that by the forgoing construction of the tool tray set 10, three different size trays can be nested together for efficient storage when not in use and to minimize the overall volume for shipment. At the same time, each tray has at least one compartment that is of a size that is long and wide enough to hold within the compartment standard mechanic's tools, such as wrenches, plyers, screw drivers, flash lights, etc.

While illustrative embodiments have been illustrated and described, it will be appreciated that various changes can be made therein without departing from the spirit and scope of the invention. For example, rather than consisting of three trays, the tool tray set could be composed of a larger number of trays, e.g., four trays, five trays, six trays, etc.

The embodiments of the invention in which an exclusive property or privilege is claimed are defined as follows:

1. A nesting tool tray set receiving and holding a plurality of arrays of mechanics tools during use, comprising:

an open first tray receiving and holding a first array of mechanics tools, the first tray comprising a first flexible base and a plurality of first compartments formed by first flexible dividing walls extending upwardly from the first base, the first compartments receive and hold the first array of mechanics tools, the first base and first dividing walls:

are of sufficient flexibility to enable the base of the first tray to assume the contour of the surface on which the first tray is set while holding the first array of mechanics tools; and are of sufficient structural integrity to receive and hold the first array of mechanics tools;

an open second tray of a size smaller than the first tray and receiving and holding a second array of mechanics tools, the second tray comprising a second flexible base and a plurality of second compartments formed by second flexible dividing walls extending upwardly from the second base, the second compartments receive and hold the second array of mechanics tools, the second base and second dividing walls:

are of sufficient flexibility to enable the base of the second tray to assume the contour of the surface on which the second tray is set while holding the second array of mechanics tools; and are of sufficient structural integrity to receive and hold the second array of mechanics tools;

an open third tray of a size smaller than the second tray to receive and hold a third array of mechanics tools, the third tray comprising a third flexible base and a plurality of third compartments formed by third flexible dividing walls extending upwardly from the third base, the third compartments receive and hold the third array of mechanics tools, the third base and third dividing walls:

are of sufficient flexibility to enable the base of the third tray to assume the contour of the surface on which the third tray is set while holding the third array of mechanics tools; and are of sufficient structural integrity to receive and hold the third array of mechanics tools;

wherein one of the first compartments closely receives therein the entire second tray;

wherein one of the second compartments closely receives therein the entire third tray;

wherein the second compartment closely receives therein the third tray is constructed of a second length extending substantially the entire length of the second tray, with the second length closely corresponding to the length of the third tray;

wherein at least one of the third compartments extending the length of the third tray to receive and hold the third array of mechanic's tools selected from the group consisting of wrenches, plyers, screw drivers, and flashlights; and wherein the first compartment that closely receives the entire second tray therein is centrally located on the first tray.

2. The nesting tool tray set of claim 1, wherein the first compartments are of a plurality of different sizes and shapes.

3. The nesting tool tray set of claim 2, wherein of the plurality of different sizes and shapes of the first compartments, the largest of the first compartments is sized and shaped to closely receive the second tray.

4. The nesting tool tray set of claim 3, wherein the second tray occupies substantially the entire volume of the largest of the first compartments.

5. The nesting tool tray set of claim 3, wherein the second compartments are of a plurality of different sizes and shapes.

6. The nesting tool tray set of claim 5, wherein of the plurality of different sizes and shapes of the second compartments, the largest of the second compartments is sized and shaped to closely receive the third tray.

7. The nesting tool tray set of claim 6, wherein the third tray occupies substantially the entire volume of the largest of the second compartments.

8. The nesting tool tray set of claim 2, wherein the second compartments are of a plurality of different sizes and shapes.

9. The nesting tool tray set of claim 8, wherein of the plurality of different sizes and shapes of the second compartments, the largest of the second compartments is sized and shaped to closely receive the third tray.

10. The nesting tool tray set of claim 1, wherein:

a. the first compartment that is sized and shaped to closely receive the second tray is constructed of a first length, with the first length closely corresponding to the length of the second tray; and b. the second compartment that is sized and shaped to closely receive the third tray is constructed of a second length extending substantially the entire length of the second tray, with the second length closely corresponding to the length of the third tray.

11. A nesting mechanics tool tray set to receive and hold a plurality of arrays of mechanic's tools during use, comprising:

a first tray comprising a first flexible base and a plurality of first compartments formed by first flexible dividing walls extending upwardly from the first base, the first compartments receive, hold, transport, and store a first array of mechanics tools, the first base and first dividing walls are of sufficient flexibility to enable the base of the first tray to assume the contour of the surface on which the first tray is set while being of sufficient structural integrity for holding the first array of mechanics tools;

a second tray of a size smaller than the first tray and comprising a length, a second flexible base, and a plurality of second compartments formed by second flexible dividing walls extending upwardly from the second base, the second compartments receive, hold, transport, and store a second array of mechanics tools, the second base and second dividing walls are of sufficient flexibility to enable the base of the second tray to assume the contour of the surface on which the second tray is set while being of sufficient structural integrity for holding the first array of mechanics tools;

a third tray of a size smaller than the second tray and comprising a length, a third flexible base and a plurality of third compartments formed by third flexible dividing walls extending upwardly from the third base, the third compartments receive, hold, transport, and store a third array of mechanics tools, the third base and third dividing walls are of sufficient flexibility to enable the base of the third tray to assume the contour of the surface on which the third tray is set while being of sufficient structural integrity for holding the third array of mechanics tools;

wherein one of the first compartments closely receives therein the entire second tray;

wherein one of the second compartments is of a length that extends the entire length of the second tray and closely corresponds to the length of the third tray, and closely receives therein the entire third tray;

wherein one of the third compartments extends the entire length of the third tray to receive and hold the third array of mechanic's tools selected from the group consisting of wrenches, plyers, screw drivers, and flashlights; and further comprising at least one hand hold located within the perimeter of the first tray, the hand hold formed at least in part by an open portion of the first base.

12. The nesting tool tray set of claim 11, wherein the first compartments are of a plurality of different sizes and shapes.

13. The nesting tool tray set of claim 12, wherein of the plurality of different sizes and shapes of the first compartments, the largest of the first compartments is sized and shaped to closely receive the second tray.

14. The nesting tool tray set of claim 13, wherein the second tray occupies substantially the entire volume of the largest of the first compartments.

15. The nesting tool tray set of claim 11, wherein the second compartments are of a plurality of different sizes and shapes.

16. The nesting tool tray set of claim 15, wherein of the plurality of different sizes and shapes of the second compartments, the largest of the second compartments is sized and shaped to closely receive the third tray.

17. The nesting tool tray set of claim 16, wherein the third tray occupies substantially the entire volume of the largest of the second compartments.

18. The nesting tool tray set of claim 11, further comprising two hand holds located in the first tray, the hand holds formed at least in part by the open portions of the first base.

19. The nesting tool tray set of claim 18, wherein the open portions of the two hand holds are located exterior of the location of the first compartment that closely receives therein the entire second tray.

* * * * *